UNITED STATES PATENT OFFICE.

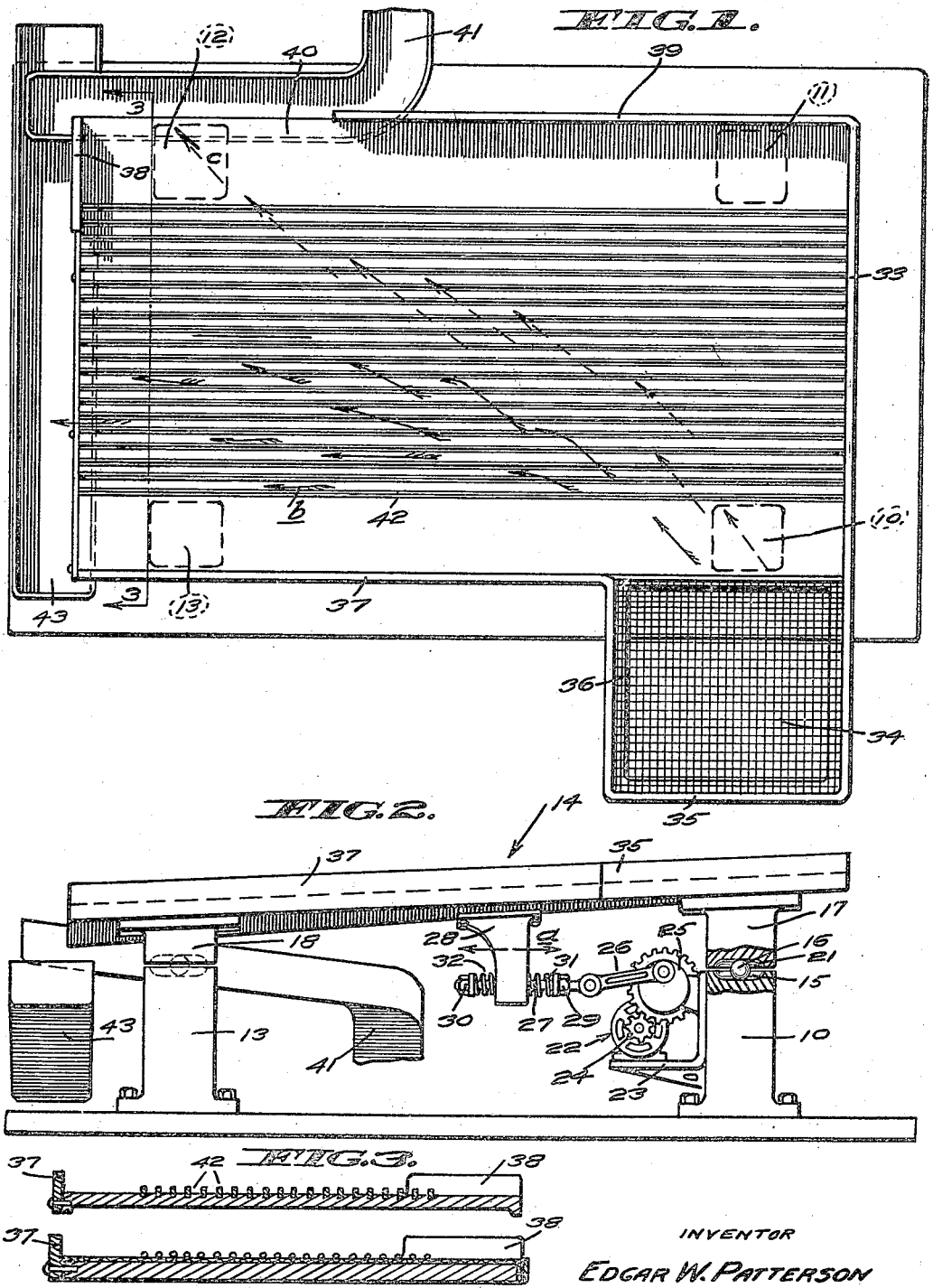

EDGAR W. PATTERSON, OF SIMI, CALIFORNIA.

METHOD OF CLEANING BEANS, PEAS, AND THE LIKE.

1,262,554.

Specification of Letters Patent.

Patented Apr. 9, 1918.

Application filed December 6, 1916. Serial No. 135,382.

*To all whom it may concern:*

Be it known that I, EDGAR W. PATTERSON, a citizen of the United States, residing at Simi, in the county of Ventura and State of California, have invented new and useful Improvements in Methods of Cleaning Beans, Peas, and the like, of which the following is a specification.

This invention relates to a method of cleaning beans and an apparatus therefor, which apparatus is also adapted for the purpose of cleaning peas and the like.

It has been a source of considerable difficulty in the bean industry to satisfactorily prepare the beans for the market in a thoroughly cleaned condition. This has been due to the fact that clods and small gravel are liable to become mixed with the beans and is difficult to be separated therefrom. When the beans are picked from the vines they are shelled and thrown upon cleaning screens by which the larger clods and rocks are removed. This sifting operation is continued through screens of successively finer mesh until all of the foreign substance has been removed except the clods and small rocks of approximately the same size as the beans. It has been common to then pass the beans along a belt conveyer at a slow rate of speed and to employ workmen to hand-pick the fine material from among the beans. This is not a positive means of cleaning them and at the same time entails an exorbitant expense. It is the principal object of this invention to provide a method and apparatus whereby beans may be thoroughly and positively cleaned in a rapid manner by a device which is inexpensive in construction and does not require the attention of skilled attendants.

The leading feature of my invention is the method by which beans are cleaned by the forces of frictional dissimilarity, stratification, inertia, specific gravity, and momentum acting differently upon the beans than upon the dirt.

It is a further object to provide a bean cleaner which is simple in its construction and may be inexpensively made and repaired.

Other objects will appear hereinafter.

The invention is illustrated, by way of example, in the accompanying drawings in which:

Figure 1 is a plan view of the bean concentrator and particularly illustrates the paths of travel followed by the foreign material and the beans.

Fig. 2 is a view in side elevation with parts broken away and illustrates the vibrating table, its driving mechanism, and mounting.

Fig. 3 is a view in transverse section as seen through one form of vibrating table and disclosing it as constructed with permanent riffles.

Fig. 4 is a view in transverse section of another form of vibrating table fitted with removable riffles made of wire or other suitable material.

My new method of cleaning beans consists of suitable agitation to cause stratification and separation by the forces of frictional dissimilarity, specific gravity, inertia and momentum, and then collecting the bean strata, the operation being carried on in a continuous stream.

Referring more particularly to the drawings, 10—13 inclusive indicate supporting pedestals upon which a vibrating or shaking table 14 is mounted. Each of these pedestals is formed with a horizontal ball race 15 within which a ball 16 is mounted. The ball races are all disposed in parallel relation to each other and thereby permit the table to be vibrated in the direction indicated by arrow —a— of Fig. 2. Downwardly extending brackets 17, 18, 19 and 20 are secured to the bottom side of the table and are fitted with ball races 21 within which the upper half of the ball is seated, thus confining the table to a direct path of travel when positively actuated by means of a motor 22. This motor is mounted upon a bracket 23 secured to the pedestals and imparts motion through gears 24 and 25 to a pitman rod 26 which is pivotally mounted to a vibrator shaft 27. The vibrator shaft passes through an opening in a shifting bracket 28 secured beneath the table and is fitted with adjusting nuts 29 and 30 adapted to adjustably hold helical springs 31 and 32 against opposite sides of the bracket 28. It will therefore be seen that rotation of the gear 25 will advance and retract the vibrator shaft 27 and impart similar movement to the table.

The table is preferably formed with a sheet metal floor which is obliquely inclined from the pedestals 10 and 11 toward the pedestal 12 and at the same time slightly inclined toward the pedestal 13, from which the floor slopes toward the pedestal 12. A ledge 33 extends along the table from the pedestals 11 to 10 and continues outwardly from the floor of the table to form a separating screen 34 which is inclosed by ledge walls 35 and 36 and communicates with the floor of the table toward which it is slightly inclined. A ledge 37 extends from the screen along the side of the floor to the corner of the table adjacent the pedestal 13. A small ledge 38 is positioned along the end of the table opposite the ledge 33 and is disposed at its lower corner. A ledge 39 extends along the floor of the table opposite the screen 34 and terminates a distance from the ledge 38 so as to form an opening 40 from the floor into a hopper 41 adapted to carry the dirt and foreign substance away. Mounted upon the floor and extending lengthwise thereof in parallel relation to each other are a series of riffles 42 which may be either formed and mounted permanently upon the floor, as indicated in Fig. 3, or may be made by arranging lengths of cord or wire over the floor, as indicated in Fig. 4. These riffles communicate with the opened end of the table and will convey the beans into a conveying trough 43 extending along the end of the table and passing beneath the conveyer 41 hereinbefore described.

In operation, after the beans have been successively cleaned through a series of sieves, they are dumped upon the screen 34 which is of a mesh slightly smaller than the beans. As the beans fall upon the screen, a portion of the fine foreign substance will fall through and become separated from the beans. During this operation, the table will be vibrated by the mechanism driven by the motor 22 beneath the table. This action will cause the beans and gravel to shake down over the floor of the table and encounter the obstructing riffles 42 positioned thereon. Due to the smooth surface of the beans, they will become distributed between the riffles and gradually work across the floor in the direction of the arrow —b—, as they cannot work over the riffles. The dirt and gravel, due to its rough surface, will work its way over the riffles in the direction of the arrows —c— and finally pass through the opening at the lower edge of the table adjacent the pedestal 12 and into the conveyer 41. At the same time, the beans will fall from the end of the table into the conveyer trough 43 from which they will be led to suitable receptacles.

The mechanism and operation above described discloses one way of carrying on my new method of cleaning beans in a continuous stream, the cleaning action being due to the stratification caused by agitation, frictional dissimilarity, specific gravity, inertia and momentum, and causing the bean strata to separate from the dirt.

It will thus be seen that the method of cleaning beans and the apparatus therefor, as herein set forth, provides a simple expedient for separating the beans from fine foreign substance by means of a mechanism which may be readily and inexpensively operated and which is not liable to require repair.

While I have shown the preferred form of my bean cleaning apparatus as now known to me, it will be understood that various changes in the combination, construction, and arrangement of parts may be made by those skilled in the art without departing from the spirit of my invention.

I claim:

A method of cleaning beans which consists in subjecting a mass to reciprocation on a riffled surface which slopes both longitudinally and diagonally, the reciprocation acting to cause the smooth beans to slide longitudinally of and between the riffles, and gravity and the reciprocation causing the rougher particles to pass over the riffles laterally of the direction of reciprocation, regardless of the specific gravities of the particles.

In testimony whereof I have signed my name to this specification.

EDGAR W. PATTERSON.

Copies of this patent may be obtained for five cents each, by addressing the "Commissioner of Patents, Washington, D. C."